United States Patent
Traylor

[11] 3,749,196
[45] July 31, 1973

[54] AXLE ATTACHMENT DEVICE
[75] Inventor: Charles O. Traylor, Springfield, Mo.
[73] Assignee: Hutchens & Sons Metal Products, Springfield, Mo.
[22] Filed: Feb. 2, 1971
[21] Appl. No.: 112,009

[52] U.S. Cl.................... 180/85, 267/52, 180/24.11
[51] Int. Cl............................................. B60g 9/00
[58] Field of Search...................... 180/24.02, 24.04, 180/24.05, 24.09, 24.11, 24.12, 24.13, 22, 71; 267/52

[56] References Cited
UNITED STATES PATENTS

| | | | |
|---|---|---|---|
| 1,947,358 | 2/1934 | Rayburn | 180/24.12 |
| 2,157,499 | 5/1939 | Rossmann | 267/52 |
| 1,936,834 | 11/1933 | Fageol | 180/24.13 |
| 3,166,142 | 1/1965 | Frazier | 180/24.12 |
| 3,410,572 | 11/1968 | Poulos | 180/22 X |

Primary Examiner—Kenneth H. Betts
Attorney—Cushman, Darby & Cushman

[57] ABSTRACT

An axle housing mounting structure is provided having one member adapted to be attached to the vehicle frame and another member adapted to be securely attached to the exterior surface of the axle housing; the two members are provided with complementary slidably interfitting surfaces so that the axle housing engaging member may be rotated about a generally horizontal axis with respect to the first member to adjust the angular orientation of the input shaft of a gear box located on the axle housing.

3 Claims, 4 Drawing Figures

INVENTOR
CHARLES O. TRAYLOR
BY Cushman, Darby & Cushman
ATTORNEYS

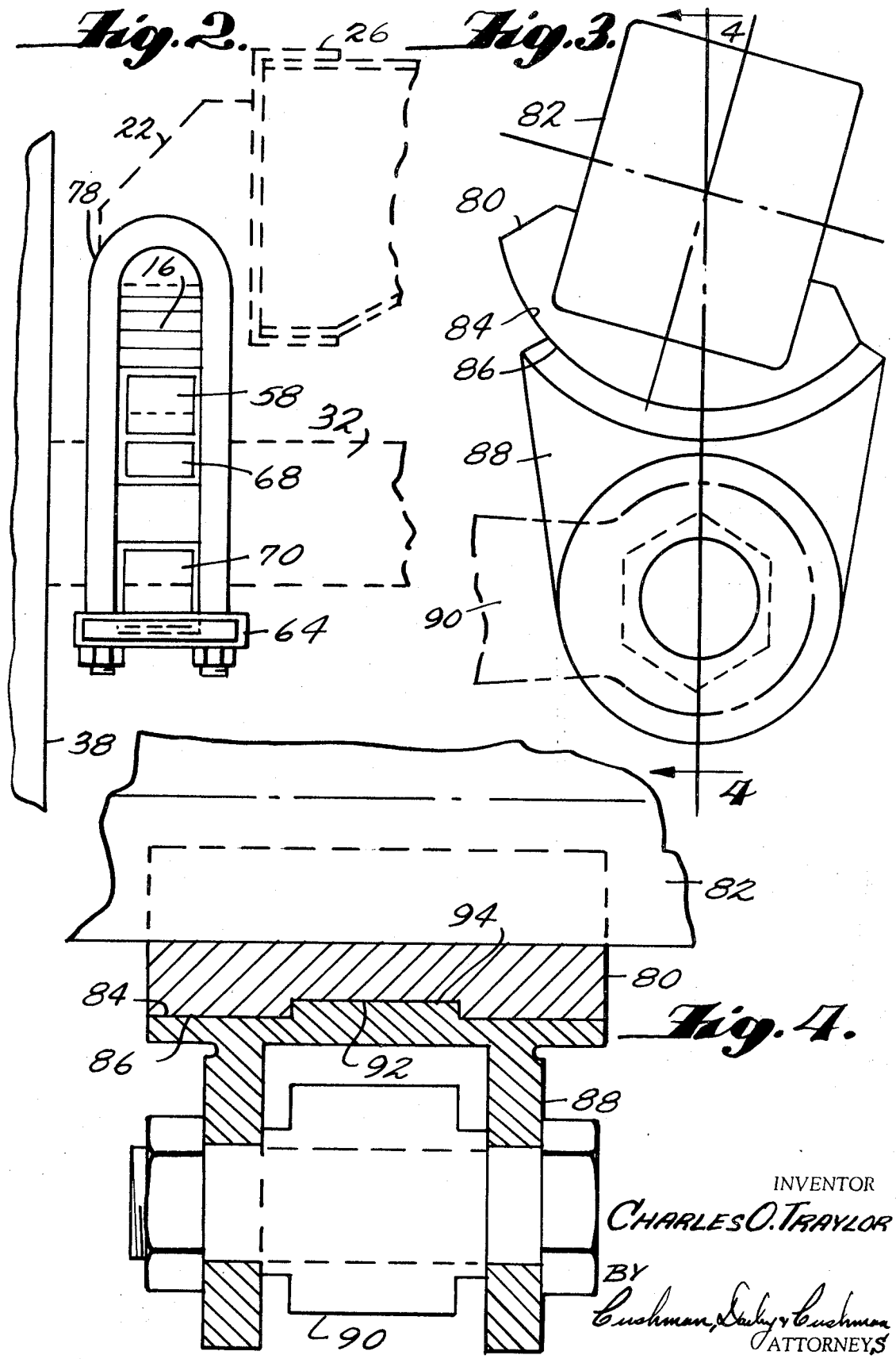

AXLE ATTACHMENT DEVICE

BACKGROUND OF THE INVENTION

The present invention relates to an improvement in axle housing mounting structures and, more particularly, to a mounting structure that is angularly adjustable about an axis.

The power trains of vehicles where the driving wheels are located in the rear and the engine in the front, generally consist of a drive shaft connected at one end to the output of the motor and at its other end to the input shaft of a gear box mounted on the axle housing. Torque is transmitted through the drive shaft and through a universal or U-joint connection to the input shaft of the gear box which transmits the torque through the vehicle axles to the drive wheels of the vehicle. In order to reduce the amount of wear and friction to which the U-joint connections of the vehicle are subjected and also to increase the efficiency with which power is transmitted from the drive shaft to the gear box input shaft, it is necessary to position the gear box so that the longitudinal axis of its input shaft is in alignment with the longitudinal axis of the drive shaft.

In order to obtain such alignment, it has been the practice for manufacturers to rotate the axle housing about a horizontal axis through an angle that is commonly referred to as the pinion angle. In vehicles having a plurality of powered axles, it is, of course, necessary to adjust the pinion angle of each housing in order to obtain the desired alignment.

The angle through which an axle housing must be rotated depends on a variety of factors such as the size of the wheel base, the distance between axles, the length of the drive shaft, the frame height of the vehicle as well as other variable factors. Accordingly, vehicle manufacturers prior to the present invention have been faced with the necessity of providing a special axle seat to accommodate each different pinion angle required due to the great variety of angle adjustments encountered.

The axle attachment devices of the prior art have generally lacked means for precisely varying the pinion angle of an axle and accordingly could not be successfully adapted to obtain precise alignment between the drive shaft and input shaft of the gear box. Moreover, the mounting structures that had been proposed have been incapable of providing a broad range of adjustment angles and have lacked sufficient structural rigidity to withstand excessive strains.

The present invention avoids all of the foregoing disadvantages by providing an axle mounting arrangement that will permit the axle to be set at any desired pinion angle and which can be suitably secured in its adjusted position to withstand severe use.

SUMMARY OF THE INVENTION

In one embodiment, the axle attachment device of the present invention consists of two elements attached to the vehicle frame through the vehicle suspension system and two axle adapter members for directly engaging the exterior of the axle housing. One element is located above the axle housing and has one end connected to the vehicle rocker beam and its upper side abutting the leaf springs of the vehicle suspension system. The surface of the element facing the axle housing is part cylindrically formed to be concavely curved. The other element is a plate disposed below the axle housing and is also provided with a part cylindrical concavely curved surface which faces in the direction of the curved surface on the upper element. The lower element may be secured to the vehicle frame by means of U-bolts depending from the leaf springs in front of and to the rear of the axle housing. The axle adapter members are formed with smooth inner surfaces adapted to be welded to the exterior of the axle housing and are disposed on opposite sides of the axle housing. The exterior surfaces of the axle adapter members are smooth, convexly curved, part cylindrical surfaces adapted to slidably interfit with the surfaces of the elements disposed above and below the axle housing. By virtue of the smooth curved interface between the axle adapter members and the elements attached to the vehicle frame, the axle housing may be rotated about its horizontal axis to obtain any desired pinion angle. Subsequent to the angular adjustment, the axle adapter members are welded to their respective mounting elements to maintain the angular orientation.

With the foregoing arrangement, a vehicle manufacturer will be able to select the desired pinion angle for a particular axle housing without incurring the expense of constructing individual axle housing seats to accommodate each pinion angle encountered.

Accordingly, it is an object of the present invention to provide an axle housing attachment device that will permit precise angular adjustment of the input shaft of the gear box carried by the axle housing with respect to the drive shaft of the vehicle.

Another object of the present invention resides in the provision of an axle attachment device which is capable of a broad range of angular adjustments thereby rendering it capable of incorporation into a large number of vehicle structures.

A further object of the present invention is the provision of an axle mounting arrangement wherein the desired angular orientation can be effected easily and quickly.

Another object of the present invention is to provide an axle mounting structure that can be inexpensively manufactured and which can be incorporated into a wide variety of differing vehicle structures.

These and other objects and attendant advantages will become apparent to those skilled in the art when further consideration is given to the following detailed description taken in conjunction with the associated drawings, in which:

BRIEF DESCRIPTION OF THE DRAWINGS

FIG. 2 is an end view in elevation taken along lines 2—2 in FIG. 1;

FIG. 3 is a side view in elevation of an alternate embodiment of the device of the present invention; and FIG. 4 is a view taken along lines 4—4 of FIG. 3.

DETAILED DESCRIPTION OF THE INVENTION

Figure 1:
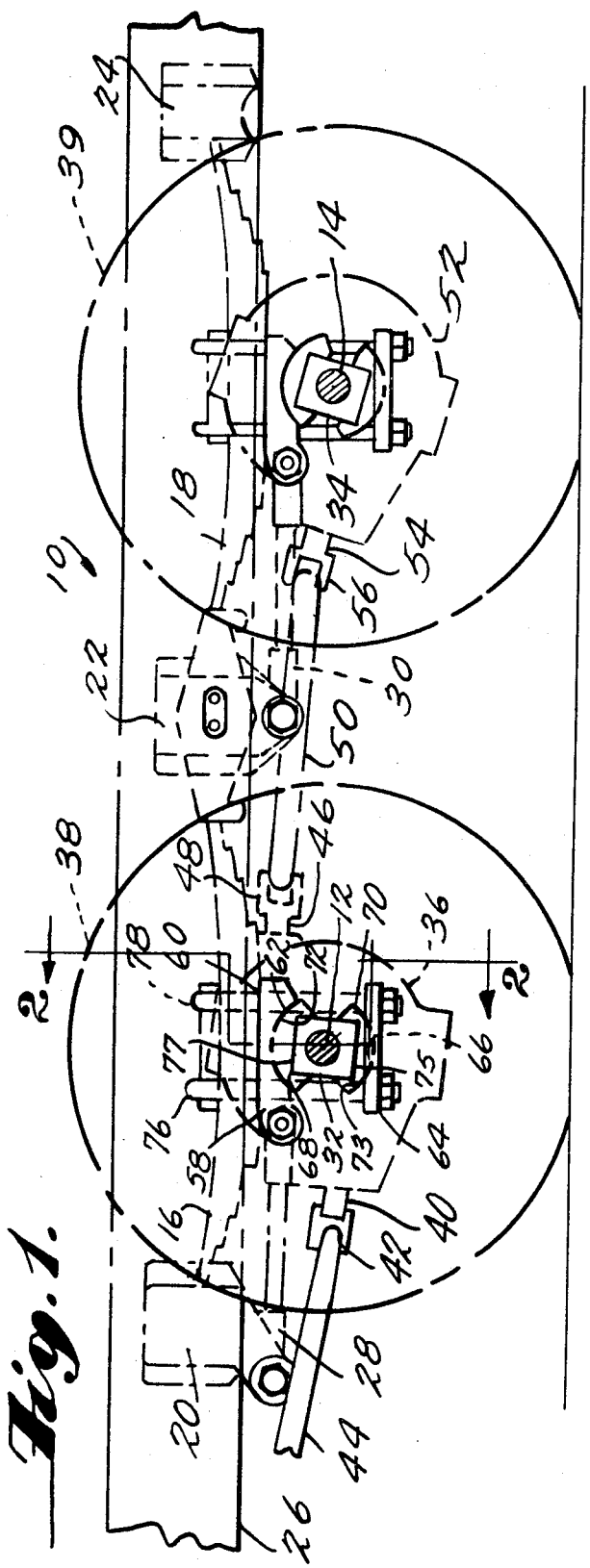
FIG. 1 is a side elevational view showing one embodiment of the present invention.

Referring now to the drawings wherein like numerals designate corresponding parts throughout the several views, there is illustrated in FIG. 1 one embodiment of the attachment device of the present invention incorporated into the suspension system of a vehicle 10 having two driven axles 12 and 14 mounted in tandem. The suspension system of the vehicle is of conventional design and consists in leaf springs 16 and 18, the ends of which are supported in brackets 20, 22 and 24 respectively each of which is attached to the vehicle frame 26. Rocker beams 28 and 30 are pivotally attached at one end to the lower ends of brackets 20 and 22 respectively.

Axles 12 and 14 are enclosed in axle housings 32 and 34 respectively. As illustrated in FIG. 1, the axle housings are rectangular in cross section but it will be understood that the present invention may be readily adapted to accommodate other housing configurations.

Axle housing 32 includes a gear box 36 which is centrally disposed with respect to the wheels, one of which is indicated at 38, mounted on the axle 12. Gear box 36 is provided with an input shaft 40 which is linked by means of a U-joint connection 42 to the drive shaft 44 which transmits torque from the vehicle motor (not shown). In addition to the axle output shaft 12 and the other axle output shaft for the wheel on the other side of the vehicle frame (not shown), gear box 36 is provided with a rearwardly extending output shaft 46 which is connected through a U-joint connection 48 to a second drive shaft 50. Gear box 52 which is enclosed in axle housing 34 is provided with an input shaft 54 which is connected through a U-joint connection 56 to the second drive shaft 50.

As illustrated in FIG. 1, the longitudinal axes of input shaft 40 and drive shaft 44 as well as that of input shaft 54 and drive shaft 50 are not in alignment. As a consequence, the power from the respective drive shafts is transmitted through an angle to the respective input shafts of the gear boxes which results in uneven friction wear on the bearings supporting the input shafts and gears mounted in the gear boxes. Additionally, as a result of the angular misalignment of the drive shafts and input shafts, a strain is placed upon the respective U-joint connections which, over a long period of use, may result in damage to these connections.

To eliminate or at least to minimize the angular misalignments referred to above, the present invention provides an axle housing seat which will enable the axle housing to be disposed at exactly the desired angle with respect to the vehicle frame. Implementation of the structure of the present invention will obviate the necessity of constructing a separate axle seat for each drive shaft connection encountered in the manufacture of vehicles.

In the embodiment of the present invention illustrated in FIG. 1, there is provided an upper member 58 which is pivotally attached to the rocker beam 28 and extends generally horizontally with respect to the vehicle frame immediately beneath the leaf spring 16. The top side 60 of member 58 is substantially flat and may be provided with a lug for insertion into a bore provided through the leaf spring 16. The underside of member 58 is formed with a smooth, concavely curved, part cylindrical surface 62. A lower member or plate 64 is disposed beneath the axle housing 32 and is provided with a surface portion 66 similar to surface 62 having the same radius of curvature. Two axle adapter elements 68 and 70 are provided having exterior, part cylindrical surfaces 72 and 73 respectively having substantially the same radius of curvature as surfaces 62 and 66 so that the axle adapter elements may slidably interfit with the concave surface portions of the upper member 58 and lower plate member 64. The interior surfaces 75 and 77 of the axle adapter elements are shaped to engage the exterior surfaces of the axle housing 32. It will be understood of course, that the shape of the interior surfaces 75 and 77 may be such as to accommodate any desired axle housing surface.

Once the desired pinion angle has been determined, the vehicle manufacturer need merely weld the axle adapter element 68 to upper member 58 with the plane of surface 77 fixed at the appropriate angle. To assist in the angular adjustment, index marks similar to a protractor marking may be embossed on the axle adapter 68 to be aligned with an index mark on the upper member 58. With member 58 mounted in the vehicle suspension system the axle housing containing the axle and gear box may then be mounted on the vehicle and secured in place by locating the lower axle adapter element 70 together with plate 64 beneath the axle and securing the plate 64 by means of U-bolts 76 and 78 to the vehicle suspension leaf springs as is more clearly shown in FIG. 2. Once the pinion angle is set and the axle housing is mounted on the vehicle frame, axle adapters 68 and 70 may be welded to their respective supporting members 58 and 64.

It will be understood that the foregoing description is fully applicable to the axle housing seat for the rear wheels 39 and that the adjustable seat of the present invention is provided for each of the powered wheels of the vehicle.

Referring now to FIG. 3 of the drawings, there is illustrated an alternate embodiment of the present invention wherein only one axle adapter element 80 is secured to the exterior of the axle housing 82 on its lower side. Complementary curved part cylindrical surfaces 84 and 86 slidably interfit with each other to provide the angular adjustment. The lower member 88 is pivotally attached to the rocker beam 90 which is attached to the vehicle frame. In the sectional view of FIG. 4, there is illustrated the disposition of a rib 92 and groove 94 provided to prevent axial misalignment between the axle adapter element 80 support member 88. It should be noted that the rib and groove arrangement is provided in each of the adjustable axle seats of the present invention. It will be apparent that by welding the axle housing 82 to the adapter 80, the axle housing may be disposed to hang below the rocker beam and support member 88.

It will be apparent that other combinations and arrangements are possible within the principles of the present invention as such principles are expressed in the appended claims.

What is claimed is:

1. A device for mounting a vehicle axle housing on a vehicle frame, said housing having a gear box of the type having an input shaft and output axle shafts for driving the vehicle wheels, said device comprising:

a first member adapted to be connected to the vehicle frame and having a smooth, concavely curved, part cylindrical surface, a second member having on one side a first surface shaped to slidably interfit with said surface of said first member and a second surface on the other side thereof for engaging a portion of said axle housing so that said axle housing may be angularly adjusted about its longitudinal axis to adjust the angular orientation of said input shaft of said gear box with respect to said vehicle frame, said second surface of said second member being welded to said axle housing and said first surface of said second member being welded to said surface of said first member, and a plate member having a smooth concavely curved, part cylindrical surface and a third member substantially identical to said second member being provided, and said plate member being disposed on the side of said axle housing opposite said first member with said third member engaging said axle housing on the side opposite said second member and with the surface of said third member corresponding to said first surface of said second member slidably interfitting with said part cylindrical surface of said plate member, and means being provided for connecting said plate member to said vehicle frame.

2. The device as claimed in claim 1 wherein said first member is pivotally connected to said vehicle frame through a rocker beam.

3. The device as claimed in claim 1 wherein said vehicle frame is provided with leaf springs adjacent said axle housing and said plate member is attached to said leaf springs by means of U-bolts disposed on either side of said axle housing.

* * * * *